[19] United States Patent
Nee

[11] Patent Number: 5,259,223
[45] Date of Patent: Nov. 9, 1993

[54] KINGPIN SECURITY DEVICE

[75] Inventor: Victor W. Nee, South Bend, Ind.

[73] Assignee: International Trade & Technologies, Inc., South Bend, Ind.

[21] Appl. No.: 703,928

[22] Filed: May 22, 1991

[51] Int. Cl.⁵ ............................................. F16B 41/00
[52] U.S. Cl. ........................................ 70/232; 70/258; 280/433; 280/507
[58] Field of Search ................ 70/14, 57, 58, 54–56, 70/158, 164, 229, 232, 258, 417; 280/507, 432, 433

[56] References Cited

U.S. PATENT DOCUMENTS

| | | | |
|---|---|---|---|
| 1,206,611 | 11/1916 | Strode | 70/423 |
| 3,408,842 | 11/1968 | Barnes et al. | 70/424 |
| 3,430,468 | 3/1969 | Joseph | 70/164 |
| 3,600,914 | 8/1971 | Johnson | 70/232 X |
| 3,977,221 | 8/1976 | Foote | 70/258 X |
| 4,444,031 | 4/1984 | Watson | 70/DIG. 57 X |
| 4,581,908 | 4/1986 | Bulle et al. | 70/58 |
| 4,620,718 | 11/1986 | Mickelson | 70/232 X |
| 4,841,756 | 6/1989 | Curtis | 70/232 |
| 5,063,759 | 11/1991 | Nee et al. | 70/14 |

FOREIGN PATENT DOCUMENTS

| | | | |
|---|---|---|---|
| 2344976 | 5/1974 | Fed. Rep. of Germany | 70/58 |
| 927017 | 4/1947 | France | 70/232 |
| 2215769 | 9/1989 | United Kingdom | 70/58 |

Primary Examiner—Lloyd A. Gall
Attorney, Agent, or Firm—Barnes & Thornburg

[57] ABSTRACT

A kingpin security device is provided preferably having a semi-circular plate transverse to a flat base. The plate has a channel therein, also preferably being semi-circular in cross-section. The channel in the plate defines a shoulder thereabove. The dimensions of the channel and the shoulder are such as to form a close fit with the annular recess and annular lip found on a standard kingpin. Opposite the vertically extending plate, the base transitions to a longitudinally extending arm. At the distal end of the arm is a shield plate, disposed generally transverse and spaced apart from the base. After the kingpin security device is affixed to a kingpin, a standard padlock can be attached to this extending arm. The shackle of the padlock prevents disengagement of the kingpin from the kingpin security device. The shield plate prevents the padlock from slipping off the arm, as well as shielding it from vandals or intruders. The kingpin security device also includes a downwardly extending vertical flange. This flange also serves to protect the body and shackles of the padlock.

14 Claims, 3 Drawing Sheets

KINGPIN SECURITY DEVICE

BACKGROUND AND SUMMARY OF THE INVENTION

The present invention relates generally to new and novel kingpin security devices. More particularly, the present invention relates to kingpin security devices which engage a portion of a kingpin extending from a trailer and, when so engaged, prevent a tractor from hitching onto the trailer.

Semi-tractors which pull loaded trailers are a prime means of transporting items from one location to another. A large trailer can be loaded and unloaded, and hitched to a motorized tractor. It is common for a single tractor to pull several different trailers. For example, a tractor may pull a trailer containing raw materials to a factory. The trailer can be unhitched and stored until the materials are needed. Meanwhile, the tractor may be hitched to another trailer which contains a finished product. The tractor may haul these items to a distribution center, where they can be distributed to several different outlets. The tractor may then be used to haul yet another trailer to one of these outlets. Thus, the ability of the tractor to engage and haul various trailers is crucial.

To meet this need, the transportation industry has established certain design standards. These include standardizing the dimensions and placement of the hitching mechanisms found on both tractors and trailers. A standard trailer includes a kingpin which extends downwardly from beneath the trailer. The kingpin is a generally cylindrical member and is located near the front end of the trailer. The kingpin includes an annular recess which forms an annular lip at its distal end. Each tractor has a hitching means which accepts the kingpin. The tractor can be backed up to the front of the trailer, until the kingpin is received by the hitching means located on the tractor. The dimensions and location of the kingpin on the trailer, and the design of the hitching means located on the tractor are governed by industry standards. This ensures the interchangeability of tractors and trailers, which is a necessity in the trucking industry. This same kingpin attachment arrangement is also widely utilized on so-called "fifth wheel" recreational vehicles to connect the trailer to the pick-up truck or other vehicle for hauling.

However, due to standardization, it is relatively easy for vandals or those with unauthorized access to a trailer to hitch the trailer to a tractor and steal the trailer and its contents. Any person having a tractor with a standard hitching mechanism may back up to and engage any trailer with a standardized kingpin. Loaded trailers are often stored for short periods of time in warehouse parking lots, and thus make easy prey for the unscrupulous. Therefore, there is a great need for economical and effective security devices which prohibit unauthorized engagement of a tractor to a trailer.

Several mechanisms have been devised to protect a trailer kingpin from unauthorized engagement to a tractor. Generally, these devices can be grouped into two categories. The first type of kingpin locking device generally utilizes a hollow, cylindrical sleeve which circumferentially encases a portion of the kingpin. A locking cam is then actuated so as to engage a portion of the annular recess on the kingpin. The cam member can then be locked into position to prevent removal of the locking device. This is commonly accomplished using an ordinary padlock or similar locking mechanism. However, ordinary padlocks can be easily removed by vandals, using heavy-duty bolt cutters or the like. Thus, it is preferable to utilize a locking mechanism which is not accessible by conventional tools.

With this in mind, many of the prior art locking devices of the first type enclose the locking mechanism within the sleeve. Such devices are shown in U.S. Pat. No. 4,553,415 to Maffey and U.S. Pat. No. 4,841,756 to Curtis. U.S. Pat. No. 3,415,085 to Eble, Jr. shows a locking device with an external plate attached to the sleeve which obstructs access to the padlock.

The second type of kingpin security mechanism generally includes devices comprising two wing members which are hingeably attached. The two wing members are pivoted about the hinge to surround the kingpin. The free ends of the two wing members are then locked together, using a conventional padlock or similar device. Such devices are shown in U.S. Pat. No. 2,785,564 to Rossi and U.S. Pat. No. 4,141,233 to Reyes.

The known prior art kingpin security mechanisms have several disadvantages. First, many of the prior art kingpin security devices are cumbersome to use and difficult to attach to a kingpin. To effectively prevent unauthorized use of the trailer, kingpin locking mechanisms must be durable, and are usually fabricated from cast iron or steel. Thus, the kingpin security device itself is often large and heavy, and difficult to handle. Thus, to attach a kingpin security device to a kingpin, the user must crawl or reach under the trailer and lift the kingpin security device over the kingpin. This is a difficult procedure when using many of the heavy and cumbersome prior art kingpin security devices.

Attaching these prior art kingpin security devices to the kingpin is further complicated in that the user must generally hold the device over the kingpin while activating the lock. Thus, while crawling or reaching underneath the trailer, the user must position the heavy and cumbersome kingpin security device over the kingpin with one hand, and position and activate the lock with the other hand. This is not always an easy task.

Another limitation of the known kingpin security mechanisms is that they often do not provide protection for the padlock or other locking device. As seen in the '564 patent to Rossi and the '233 patent to Reyes, the shackles of the engaged padlock are exposed. Vandals using bolt cutters could easily cut through the lock shackles and remove these kingpin security devices from the kingpin. Some of the sleeve type kingpin security devices have attempted to solve this problem by enclosing the locking device within the kingpin security device itself. However, doing so typically adds to the cost, weight and complexity of the kingpin security mechanism.

Many known security mechanisms are also limited in their ability to withstand substantial force. If a tractor would attempt to engage a trailer which has many of the currently known kingpin security devices engaged to it, the force exerted by the hitching mechanism will often cause deformation of the security device. Such deformation can preclude the kingpin security mechanism from further use. More importantly, it may be difficult to remove a severely deformed kingpin security device from the kingpin. Because a close tolerance fit about the kingpin is necessary for many kingpin security devices, relatively small deformations may prohibit normal removal of the kingpin security device from the kingpin. If normal removal is not possible, a torch or similar device may be required to remove the deformed kingpin security device from the kingpin.

Accordingly, an object of the present invention is the provision of a kingpin security mechanism which does not experience excessive deformation from normal forces.

Another object of the present invention is to provide a kingpin security mechanism which is relatively compact and lightweight, and which can be easily handled, installed and removed by a user.

A further object of the present invention is to provide a kingpin security mechanism which slidably engages a portion of a trailer kingpin, and which does not need to be held in place while a conventional padlock or similar locking device is attached thereto.

Yet another object of the present invention is to provide a kingpin security mechanism which shields the shackles of the padlock from vandals using conventional tools.

A still further object of the present invention is to provide a kingpin security mechanism which is economical to manufacture.

Yet another object of the present invention is to provide a kingpin security mechanism which slidably engages a portion of the annular lip of the kingpin.

These and other objects of the present invention are attained by the provision of a kingpin security device preferably fabricated from ductile iron. The kingpin security device preferably comprises a base having a generally flat top surface and a plate which extends vertically upwardly from the top surface. In some preferred embodiments, the base has a generally semi-circular cross-section and includes a channel adjacent the top surface of the base. In other preferred embodiments, the base has an interrupted semi-circular cross-section and includes a channel adjacent to the top surface of the base. The channel engages with the annular lip of the kingpin, and the upwardly extending plate engages with a portion of the annular recess of the kingpin.

Opposite the upwardly extending plate, the base includes a horizontally extending arm portion. A standard padlock is attached to the kingpin security device such that the shackles of the lock go around the arm. The bight of the shackles engage the annular lip of the kingpin at a point opposite its engagement within the channel. This secures and prevents disengagement of the kingpin from the kingpin security device. Attached to the distal end of the arm portion is a shield plate. The base is further provided a flange extending upwardly from the base. The downwardly extending flange and the shield plate are spaced such that the shackles and body of the padlock are positioned therebetween, but access to the shackles by conventional tools is precluded. A reinforcing rib preferably extends from the bottom surface of the base to the flange, and provides additional structural support for the kingpin security device.

Other objects, advantages and novel features of the present invention will become apparent in the following detailed description of the invention when considered in conjunction with the accompanying drawings.

DETAILED DESCRIPTION OF THE DRAWINGS

Figure 1:
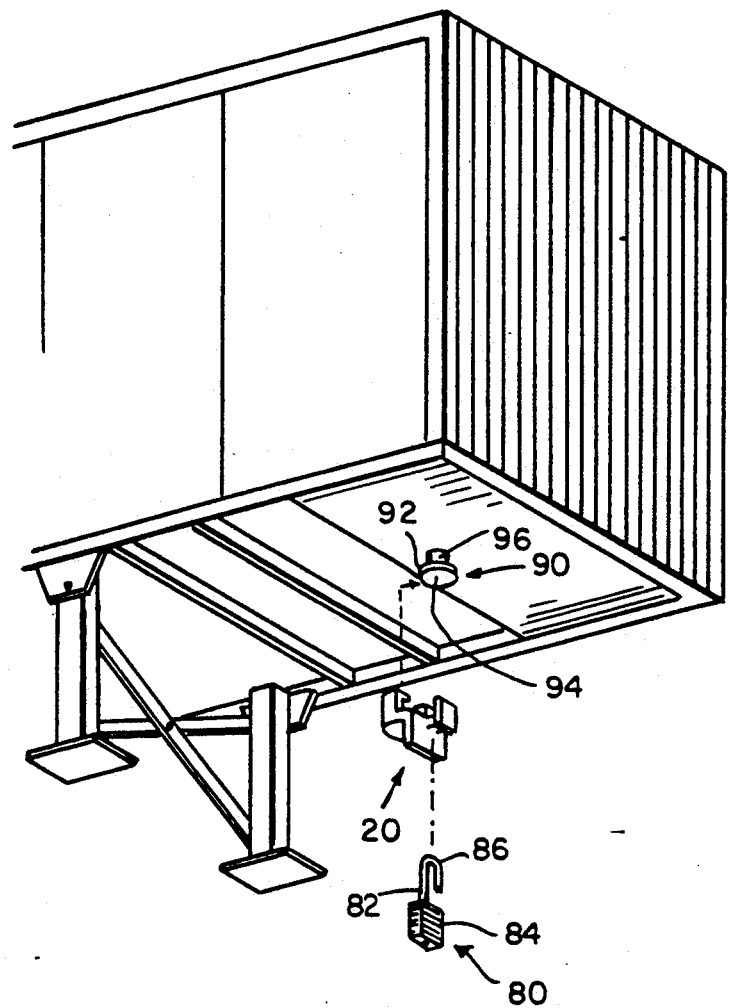
FIG. 1, which illustrates a preferred embodiment of a kingpin security mechanism, shows an exploded perspective view of the kingpin security device and padlock in relation to a cargo trailer having a conventional kingpin.

Referring now to the drawings, in which like-referenced characters indicate corresponding elements throughout the several views, attention is first directed to FIGS. 1 through 4 which illustrate a first preferred embodiment of the kingpin security mechanism according to the present invention. The kingpin security mechanism generally comprises kingpin security device 20 and padlock 80. Kingpin security device 20 includes generally planar base 30 which has top surface 32 and bottom surface 34. While it will be recognized to those having ordinary skill in the relevant art that base 30 can be different configurations, in the preferred embodiment shown it is generally semi-circular. Extending upwardly from top surface 32 of base 30 is annular lip engaging portion 40. In the preferred embodiment shown, annular lip engaging portion 40 is also semi-circular in configuration.

Kingpin 90 is of conventional design and is secured at its upper end by conventional means to a trailer or similar vehicle to be towed. At its lower end, kingpin 90 has an outwardly extending annular lip 92 having bottom surface 94. Annular lip 92 is greater in diameter than downwardly extending portion 96 of kingpin 90.

Annular lip engaging portion 40 includes interior surface 42 and exterior surface 44. Interior surface 42 includes channel 46 which extends upwardly from top surface 32 of base 30. Channel 46 is dimensioned to have a height slightly greater than the height of annular lip 92 of kingpin 90.

When placing kingpin security device 20 on kingpin 90, top surface 32 of base 30 is positioned below bottom surface 94 of kingpin 90 and kingpin security device 20 is raised upwardly so channel 46 is aligned with annular lip 92. Kingpin security device 20 is then slid horizontally into position and channel 46 engages with a portion of annular lip 92. Top surface 48 of channel 46 rests on top surface 98 of annular lip 92. Thus, at this point, kingpin 90 supports the weight of kingpin security device 20. Therefore, once so engaged, the user does not need to support the weight of the kingpin security device 20. To assure proper engagement between channel 46 and annular lip 92, it is preferred that channel 46 be sized so as to engage no more than 180° of the circumference of annular lip 92. If channel 46 comprises an arc significantly greater than 180°, proper engagement between channel 46 and annular lip 92 would be inhibited.

Figure 3:
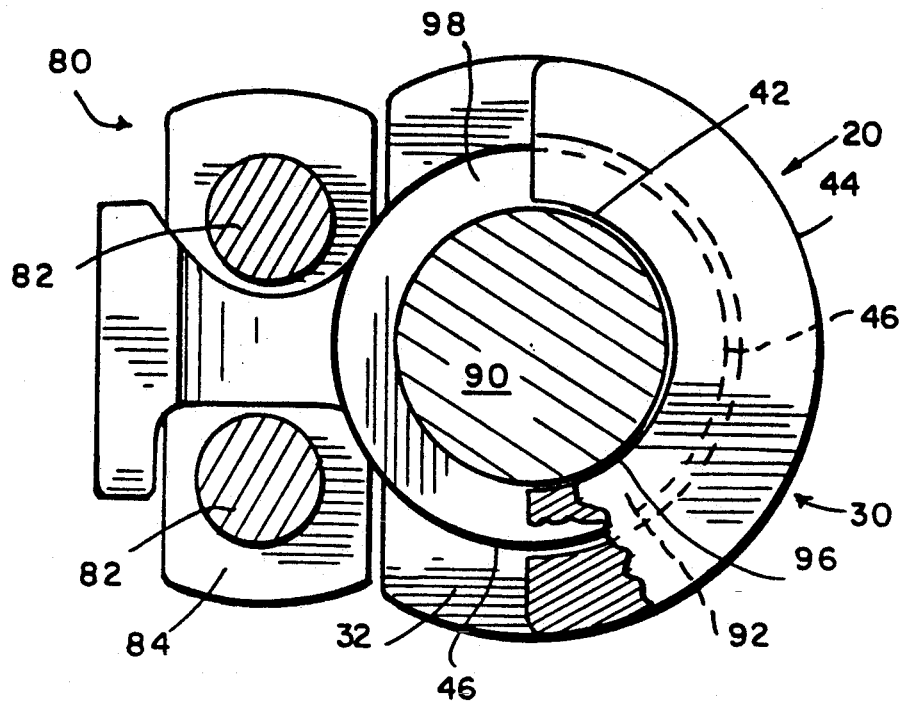
FIG. 3 is a top view of the kingpin security mechanism shown in FIG. 1 installed on the kingpin, the kingpin being shown in cross-section.
Figure 4:
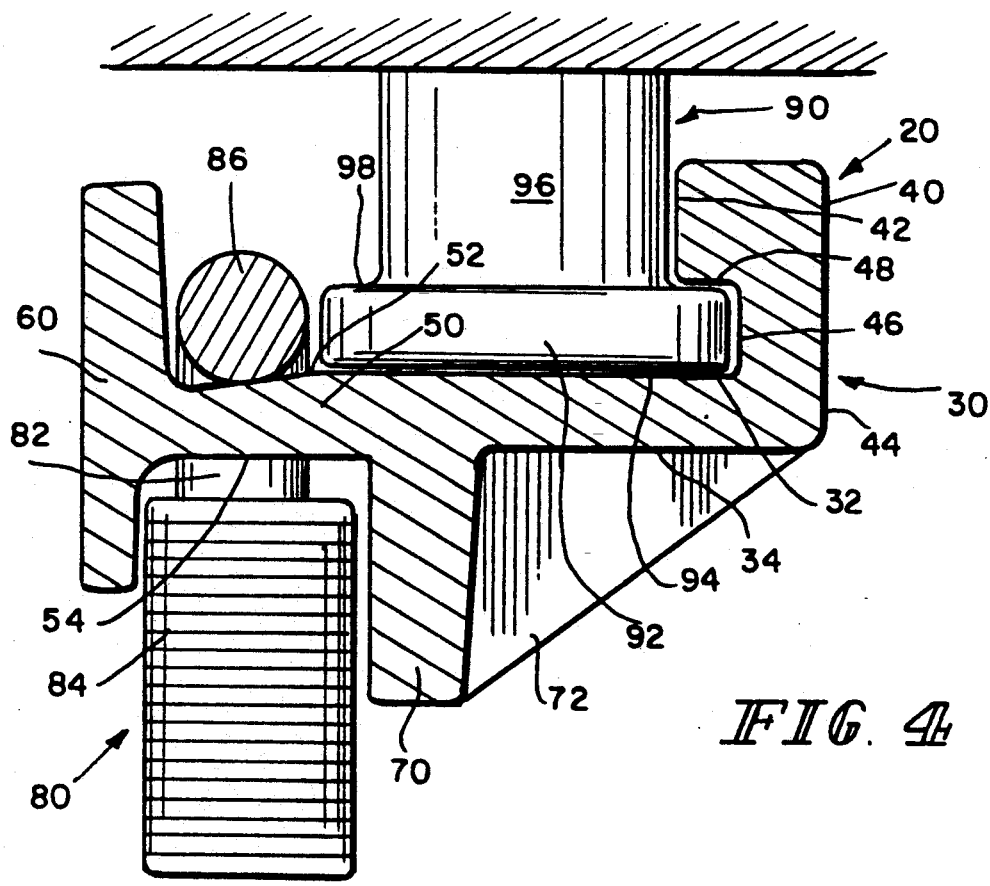
FIG. 4 is a cross-sectional view of the kingpin security mechanism shown in FIG. 1 taken across lines 4—4 in FIG. 3, and the kingpin being shown in full.

Opposite annular lip engaging portion 40, base 30 transitions into longitudinally extending arm 50. In the preferred embodiment shown, top surface 52 of arm 50 is substantially co-planar with top surface 32 of base 30 and has substantially rectangular cross-section. Once a kingpin security device 20 has been positioned on kingpin 90, padlock 80 is positioned so shackle 82 goes around arm 50. As seen in FIG. 3, in this position shackle 82 of padlock 80 precludes horizontal movement of kingpin security device 20 by securing kingpin 90 between channel 46 and shackle 82. Thus, shackle 82 prevents translation of kingpin 90 with respect to kingpin security device 20, and annular lip 92 is prevented from disengaging channel 46.

Extending downwardly from arm 50 is shield plate 60. Shield plate 60 is positioned generally transverse to base 30, and prevents padlock 80 from slipping off of arm 50. In the preferred embodiment shown, shield plate 60 extends both above top surface 52 and below bottom surface 54 of arm 50. Thus, shield plate 60 also serves to guard or shield padlock 80 from vandals or unauthorized intruders.

Figure 2:
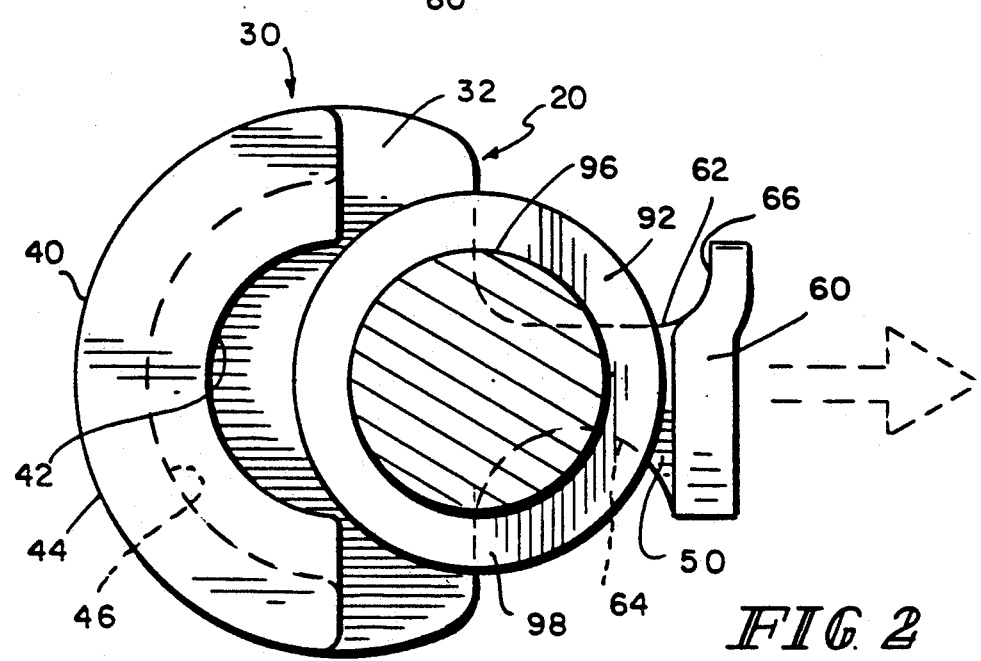
FIG. 2 is a top view of the kingpin security device shown in FIG. 1 being installed on the kingpin, the kingpin being shown in cross-section.

As seen in FIG. 2, the combination of shield plate 60 and arm 50 form alcove 62 and hollow 64. This view also illustrates groove 66 in shield plate 60. Groove 66 helps form alcove 62, which is a generally rectangular space between shield plate 60 and base 30. Alcove 62 provides the clearance necessary for padlock 80 to be positioned about arm 50. Unlike generally rectangular alcove 62, hollow 64 is curved, to form a space with a generally U-shaped cross section. Thus, hollow 64 provides less clearance between shield plate 60 and base 30 than does alcove 62. Because of this reduced clearance, padlock body 84 of standard sized padlock 80 will not easily fit into hollow 64.

When attaching padlock 80 to kingpin security device 20, padlock body 84 is initially positioned within alcove 62. Shackles 82 extend adjacent top surface 52 and bottom surface 54 of arm 50. Bight 86 of shackles 82 rests within hollow 64. Once padlock 80 is secured about arm 50, it can be rotated to a position substantially perpendicular to the ground. However, in other embodiments, arm 50, alcove 62 and hollow 64 can be dimensioned so once padlock 80 is secured about arm 50, shackle 82 remains substantially parallel to the ground.

Extending downwardly from bottom surface 34 of base 30 is flange 70. Flange 70 also acts as a guard, shielding the portion of shackle 82 which is adjacent bottom surface 54 of locking arm 50. Reinforcing rib 72 extends from bottom surface 34 of base 30 to flange 70, thus providing additional structural support to kingpin security device 20.

In the preferred embodiment shown, kingpin security device 20 is fabricated from a high grade 80-55-06 perlite ductile iron material. However, it will be recognized by those skilled in the art that other suitable materials may be used. Furthermore, it is anticipated that padlock 80 could be a key actuated or a combination type lock as preferred by the user.

The relative ease with which kingpin security device 20 can be used should now be apparent. When it is desired to prevent unauthorized access to a trailer, kingpin security device 20 is attached and secured with padlock 80 to kingpin 90, thus precluding engagement of the trailer by a tractor. The small, lightweight nature of kingpin security device 20 allows a user to reach underneath the trailer and place the unit on kingpin 90. Kingpin security device 20 is placed such that the bottom surface 94 of kingpin 90 rests flush against top surface 32 of base 30 and top surface 52 of locking arm 50. The user then slides kingpin security device 20 until a portion of annular lip 92 engages channel 46. At this point, the user no longer needs to support the weight of kingpin security device 20. Top surface 48 of channel 46 engages with top surface 98 of annular lip 92 and kingpin 90 will support the weight of kingpin security device 20.

Padlock 80 is then secured to kingpin security device 20 about arm 50. Arm 50 is dimensioned such that it will accommodate standard padlock sizes. Padlock body 84 is positioned within alcove 62 and hollow 64 and bight 86 is secured adjacent top surface 52 of arm 50. In this position, shackle 82 engages with annular lip 92 thus preventing translation of kingpin 90 with respect to kingpin security device 20. Shield plate 60 and flange 70 preclude vandals using conventional tools from accessing and removing padlock 80 from kingpin security device 20.

Figure 5:
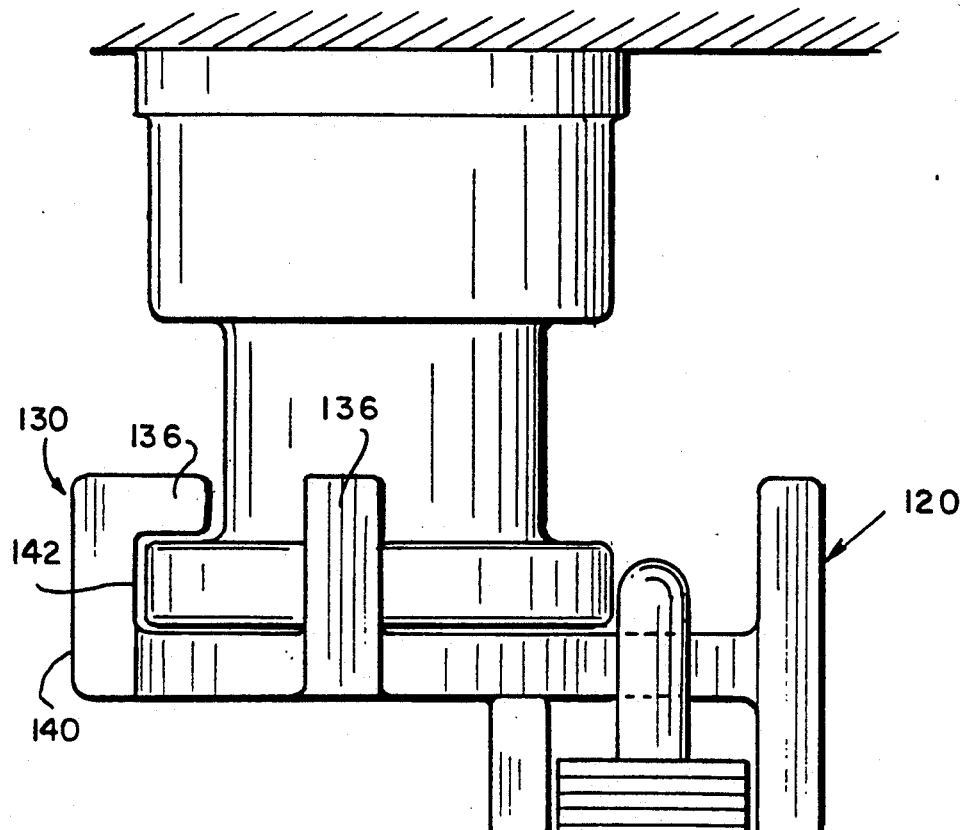
FIG. 5, which illustrates a second preferred embodiment of a kingpin security mechanism, shows a plan view of the kingpin security mechanism installed on a kingpin.
Figure 6:
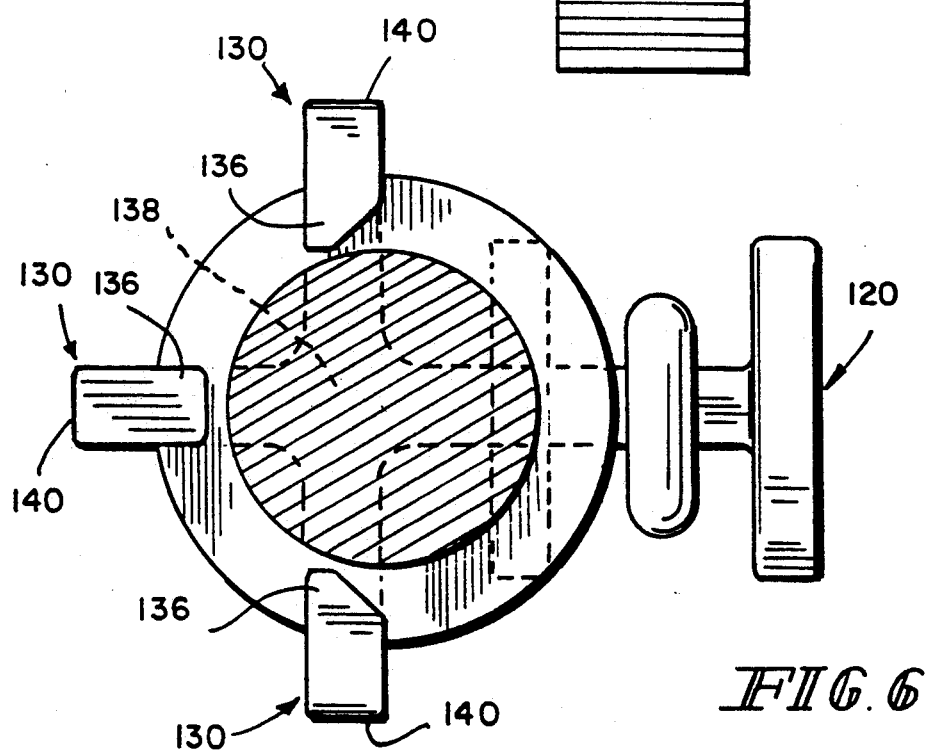
FIG. 6 is a top view of the second embodiment of the kingpin security mechanism shown in FIG. 5 installed on the kingpin, the kingpin being shown in cross-section and portions broken away for purposes of clarity.

Referring now to FIGS. 5 and 6, a second embodiment of a kingpin security mechanism is shown. Kingpin security mechanism includes kingpin security device 120 and padlock 80 of conventional design. Kingpin security device 120 is similar to kingpin security device 20 with the exception that rather than base 130 being of a semi-circular configuration, base 130 consists of three discrete fingers 136, each of which extend substantially perpendicular to each other from a central portion 138. Fingers 136 each include an upwardly extending annular lip engaging portion 140 with channels 142 to engage with annular lip 92 of kingpin 90 as previously described. Installation and removal of kingpin security device is similar to that described in conjunction with kingpin security device 20.

Although the present invention has been described above in detail, the same is by way of illustration and example only and is not to be taken as a limitation on the present invention. For example, rather than fabricating security lock 20 as an integral single piece, security lock 20 can comprise two or more interconnecting pieces with, for example, a retaining finger slid, rotated, or pivoted into position over annular lip 92 of kingpin 90. The scope and content of the present invention are defined only by the terms of the appended claims.

What is claimed:

1. A kingpin security device for slidably engaging a portion of an annular lip provided near a distal end of a kingpin, comprising:
   a base having a top surface and a bottom surface;
   a generally vertically extending annular lip engaging portion extending from said top surface of said base;
   said annular lip engaging portion including a channel therein for slidably engaging said annular lip, such that said device remains in position about said kingpin unsupported by external means;
   a locking means external to said device for securing said device to said kingpin; and
   a shielding means for limiting access to said locking means using conventional tools, said shielding means including a shield plate spaced from and extending generally transverse to said base, an arm extending between said base and said shield plate and a flange extending transverse to said base from said bottom surface of said base.

2. The kingpin security device according to claim 1, wherein said locking means includes a standard padlock.

3. The kingpin security device according to claim 2, wherein a shackle of said padlock is placed about said arm.

4. The kingpin security device according to claim 3, wherein said flange and said shield plate limit access to the shackle of said padlock using conventional tools.

5. The kingpin security device according to claim 4, wherein said arm includes a top surface and a bottom surface, said top surface of said arm and said top surface of said base being substantially co-planar.

6. A kingpin security device for a generally cylindrical kingpin having an annular recess near its distal end, thus defining an annular lip, comprising:
a base having a top surface and a bottom surface; an annular lip engaging portion extending from said top surface of said base transverse to said base;
said annular lip engaging portion having a channel therein for receiving said annular lip;
a shield plate spaced from and extending generally transverse to said base;
an arm extending between said base and said shield plate for receiving a shackle of a padlock;
a flange extending from said bottom surface of said base and extending transverse to said base;
said shield plate and said flange spaced so as to preclude access to said shackle when said padlock is secured on said kingpin security device; and
such that said annular lip engaging portion engages and substantially surrounds at least a portion of said annular lip on said generally cylindrical kingpin.

7. The kingpin security device according to claim 6, further including means for providing support between said flange and said base.

8. The kingpin security device according to claim 6, wherein said annular lip engaging portion comprises a plurality of discrete fingers which engage with said annular lip of said kingpin.

9. The kingpin security device according to claim 8, wherein said shackle of said padlock abuts said kingpin.

10. The kingpin security device according to claim 6, wherein said annular lip engaging portion extending from said top surface of said base has a generally semi-circular cross-section, said annular lip engaging portion extending continuously in an arc of approximately 180°.

11. The kingpin security device according to claim 10, wherein said channel has a generally semi-circular cross-section.

12. A kingpin security device for a generally cylindrical kingpin having an annular recess near its distal end, thus defining an annular lip, comprising:
a base having a top surface and a bottom surface;
an annular lip engaging portion extending from said top surface of said base transverse to said base;
said annular lip engaging portion having a channel therein for receiving said annular lip;
a shield plate being spaced from and extending generally transverse to said base;
an arm extending between said base and said shield plate for receiving a shackle of a padlock;
a flange extending from said bottom surface of said base and extending transverse to said base;
said shield plate and said flange being spaced so as to preclude access to a shackle when a padlock is secured on said kingpin security device; and
said annular lip engaging portion comprising a plurality of discrete fingers which engage with said annular lip of said kingpin.

13. The kingpin security device according to claim 12, further including a standard padlock placed about said arm.

14. The kingpin security device according to claim 13, wherein the shackle of said padlock abuts said kingpin.

* * * * *